(12) United States Patent
Fujiyama

(10) Patent No.: US 8,169,488 B2
(45) Date of Patent: May 1, 2012

(54) DIGITAL CAMERA FOR PERFORMING EXPOSURE DURING ROTATION TO PRODUCE A PANORAMIC IMAGE

(75) Inventor: Michihiro Fujiyama, Kyoto (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 558 days.

(21) Appl. No.: 12/183,634

(22) Filed: Jul. 31, 2008

(65) Prior Publication Data
US 2009/0033767 A1    Feb. 5, 2009

(30) Foreign Application Priority Data

Jul. 31, 2007 (JP) ................................. 2007-198647

(51) Int. Cl.
*H04N 5/228* (2006.01)
*H04N 5/235* (2006.01)
*H04N 7/00* (2011.01)
*G03B 7/00* (2006.01)

(52) U.S. Cl. .................... 348/208.3; 348/36; 348/362

(58) Field of Classification Search .............. 348/208.3
See application file for complete search history.

(56) References Cited

U.S. PATENT DOCUMENTS

| | | | |
|---|---|---|---|
| 6,930,703 B1 * | 8/2005 | Hubel et al. | 348/37 |
| 7,616,883 B2 * | 11/2009 | Nakajima et al. | 396/263 |
| 7,932,925 B2 * | 4/2011 | Inbar et al. | 348/208.2 |
| 2003/0231392 A1 * | 12/2003 | Hoefft et al. | 359/557 |
| 2005/0099494 A1 * | 5/2005 | Deng et al. | 348/36 |
| 2005/0237383 A1 * | 10/2005 | Soga | 348/36 |
| 2006/0039693 A1 * | 2/2006 | Lee et al. | 396/322 |
| 2006/0250505 A1 * | 11/2006 | Gennetten et al. | 348/218.1 |
| 2007/0263995 A1 * | 11/2007 | Park et al. | 396/50 |
| 2010/0253763 A1 * | 10/2010 | Shioya et al. | 348/36 |

FOREIGN PATENT DOCUMENTS

| | | |
|---|---|---|
| JP | 2000-305207 A | 11/2000 |
| JP | 2001-028706 A | 1/2001 |
| JP | 2001-223932 A | 8/2001 |

OTHER PUBLICATIONS

Japanese Office Action dated Jun. 8, 2011, issued in corresponding Japanese Patent Application No. 2007-198647.

* cited by examiner

*Primary Examiner* — Albert Cutler
(74) *Attorney, Agent, or Firm* — Westerman, Hattori, Daniels & Adrian, LLP

(57) ABSTRACT

A digital camera includes an imager. An optical image of an object scene is irradiated onto an imaging surface of the imager. When the digital camera is rotated, a CPU starts measuring processing for repetitively measuring a rotation angle, and suppresses a change due to the rotation in a positional relationship between the imaging surface and the optical image on the basis of the result of the measurement. The CPU performs exposure processing on the imager every time that the measurement result and the angle of view of the optical image on the imaging surface satisfy the angular condition, and captures the object scene image generated on the imaging surface in to a memory. The plurality of object scene images thus stored in the memory are combined with each other to thereby produce a single panoramic object scene image.

8 Claims, 13 Drawing Sheets

(A)

(B)

(C) START OF EXPOSURE : p=P-s, t=0

(D)

(A)

(B) END OF EXPOSURE : p=P+s, t=T (C)

DIGITAL CAMERA FOR PERFORMING EXPOSURE DURING ROTATION TO PRODUCE A PANORAMIC IMAGE

CROSS REFERENCE OF RELATED APPLICATION

The disclosure of Japanese Patent Application No. 2007-198647 filed on Jul. 31, 2007 is incorporated herein by reference.

BACKGROUND OF THE INVENTION

1. Field of the Invention

The present invention relates to a digital camera. More specifically, the present invention relates to a digital camera which repetitively performs exposures and rotates about an axis at the same time, and combines a plurality of obtained object scene images to produce a single panoramic object scene image.

2. Description of the Related Art

In the related art, a rotation angle from the start of the previous exposure to this point is measured, and if the measured rotation angle is equal to the fixed rotation angle, a shooting is executed. Alternatively, when the measured rotation angle is equal to the fixed rotation angle, a notification is executed to a user. By these, an improvement in efficiency and accuracy as to a panoramic shooting is intended.

However, in the related art, during a panoramic shooting, a camera is required to stand still every exposure. Otherwise, a blurring due to a rotation occurs. Thus, a panoramic shooting remains time consuming and laborious.

SUMMARY OF THE INVENTION

The present invention employs following features in order to solve the above-described problems. It should be noted that reference numerals inside the parentheses and supplemental remarks show one example of a corresponding relationship with the embodiments described later for easy understanding of the present invention, and do not limit the present invention.

A digital camera according to a first invention comprises a housing provided with an optical lens; an imager provided to the housing and having an imaging surface onto which an optical image of an object scene is irradiated through the optical lens; a measurer for repetitively measuring a rotation angle of the housing; a suppresser for suppressing the change in a positional relationship between the imaging surface and the optical image irradiated onto the imaging surface on the basis of the measurement result by the measurer; an exposer for performing an exposure processing on the imager every time that the measurement result by the measurer and an angle of view of the optical image irradiated onto the imaging surface satisfy an angular condition; and a capturer for capturing in a memory the object scene image generated on the imaging surface according to the exposure processing by the exposer.

In the first invention, a housing (10A) of a digital camera (10) is provided with an optical lens (12) and an imager (14). An optical image of an object scene is irradiated onto an imaging surface (14*f*) of the imager through the optical lens.

When the housing (10A) of the digital camera is rotated, a measurer (S91, S93, 36) starts measuring processing for repetitively measuring a rotation angle (p) of the housing. A suppresser (S1, S71, S77) suppresses the change due to a rotation in a positional relationship between the imaging surface and the optical image on the basis of the measurement result by the measurer. An exposer (S41, S57, 34) performs exposure processing on the imager every time that the measurement result by measurer and an angle of view (P) of the optical image irradiated onto the imaging surface satisfy an angular condition.

The object scene image generated on the imaging surface according to the exposure processing by the exposer is captured in a memory (20) by a capturer (18). A plurality of object scene images thus stored in the memory are combined with each other to produce a single panoramic object scene image.

According to the first invention, every time that the rotation angle and the angle of view satisfy the angular condition, an exposure processing is executed, and therefore, it is possible to produce a panoramic object scene image with a high degree of precision. Furthermore, the change in a positional relationship between the imaging surface and the optical image is suppressed by the suppresser, and therefore, there is no need of stopping the rotation every exposure.

A digital camera according to a second invention is dependent on the first invention, and the measurer includes a detector for detecting an angular velocity of the housing, and a first calculator for calculating a rotation angle from a starting point of each exposure processing by the exposer on the basis of the detection result by the detector.

In the second invention, in measuring a rotation angle, a detector (S91, 36) detects an angular velocity (w) of the housing. A first calculator (S93) calculates a rotation angle from a starting point of each exposure processing by the exposer on the basis of the detection result by the detector.

A digital camera according to a third invention is dependent on the first or the second invention, and further comprises a displacer for displacing a position of the imager with respect to the housing, wherein the suppresser controls the displacer on the basis of the measurement result by the measurer to cause the imager to follow a movement of the optical image.

In the third invention, a displacer (38) displaces a position of the imager with respect to the housing on the basis of the measurement result by the measurer. The suppresser controls the displacer to cause the imager to follow a movement of the optical image.

A digital camera according to a fourth invention is dependent on the third invention, and further comprises a first invalidator for invalidating the suppresser during a period from an end of one exposure processing to a start of the next exposure processing, by the exposer; and an advancer for advancing the imager with respect to the housing by controlling the displacer during a period when the suppresser is invalidated by the first invalidator.

In the fourth invention, the suppresser is invalidated by a first invalidator (S61) during a period from an end of one exposure processing to a start of the next exposure processing, by the exposer. An advancer (S65, S67) executes advancing processing for advancing the imager with respect to the housing during a period when the suppresser is invalidated by the first invalidator.

According to the fourth invention, the allowance of at least any one of the angular velocity and the exposure time is increased.

A digital camera according to a fifth invention is dependent on the fourth invention, and further comprises a second calculator for calculating a half-value of the rotation angle of the housing corresponding to the exposure time of one exposure processing by the exposer on the basis of the detection result by the detector, wherein the advancer causes a position of the imager with respect to the housing by a distance corresponding to the calculation result by the second calculator.

In the fifth invention, a second calculator (S95) calculates a half-value (s=w*T/2) of the rotation angle of the housing corresponding to the exposure time (T) of one exposure processing by the exposer on the basis of the angular speed (w) as a detection result by the detector. The advancer advances a position of the imager with respect to the housing by a distance (m) corresponding to the calculation result (s) by the second calculator.

Here, a value corresponding to fluctuation of rotation may be added to the aforementioned value s. That is, s=w*T/2+α. Or, s=w*T/(2−β) (here, β<<1).

According to the fifth invention, the allowance becomes about twice as much as when the advancing processing is not executed. It should be noted that as the advancing angle is large, the allowance is increased, but the image quality is lost due to the displacement of the optical axis (z) of the imager and the optical axis (Z) of the optical lens.

A digital camera according to a sixth invention is dependent on the fifth invention, and further comprises a second invalidator for invalidating the advancer when the calculation result by the second calculator is above a maximum rotation angle corresponding to a maximum displacement by the displacer; and an informer for executing informing processing to a user in response to the invalidating processing by the second invalidator.

In the sixth invention, the advancer is invalidated by the second invalidator (S63) when the calculation result (s) by the second calculator is above a maximum rotation angle (S) corresponding to a maximum displacement (D) by the displacer (s>S). In response thereto, informing processing to the user is executed by an informer (S75, S123, S125).

According to the sixth invention, when the angular velocity of the housing is above the allowance, the advancing processing is not executed, but the informing processing is alternatively performed, and therefore, an exposure can be performed by the user with the rotating movement stopped.

A digital camera according to a seventh invention is dependent on the sixth invention, and the angular condition is a condition that the calculation result by the first calculator reaches a value obtained by subtracting the calculation result by the second calculator from the angle of view during a period when the advancer is not invalidated by the second invalidator, and the angular condition is a condition that the calculation result by the first calculator coincides with the angle of view during a period when the advancer is invalidated by the second invalidator.

According to the seventh invention, if the angular velocity (w) is not above the allowance, the imager advances by a distance (m) corresponding to the calculation result (s) by the second calculator, and the exposure to the imager is started when the rotation angle (p) reaches a value smaller than the angle of view (P) by the calculation result (s) by the second calculator (p≧P−s), and therefore, distortion of the object scene image can be minimized by the suppressor. On the other hand, when the angular velocity is above the allowance, the informing processing is executed in place of the advancing processing, and the exposure processing is executed when the rotation angle (p) coincides with the angle of view (P) (p=P) after the informing processing.

A digital camera according to an eighth invention is dependent on the invention according to any one of the first to seventh inventions, and further comprises a producer for combining a plurality of object scene images stored in the memory with each other to produce a single panoramic object scene image.

In the eighth invention, a producer (S19) combines a plurality of object scene images stored in the memory with each other to produce a single panoramic object scene image.

According to the present invention, the rotation need not to be stopped every rotation, so that it is possible to efficiently perform a panoramic shooting with high precision.

The objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
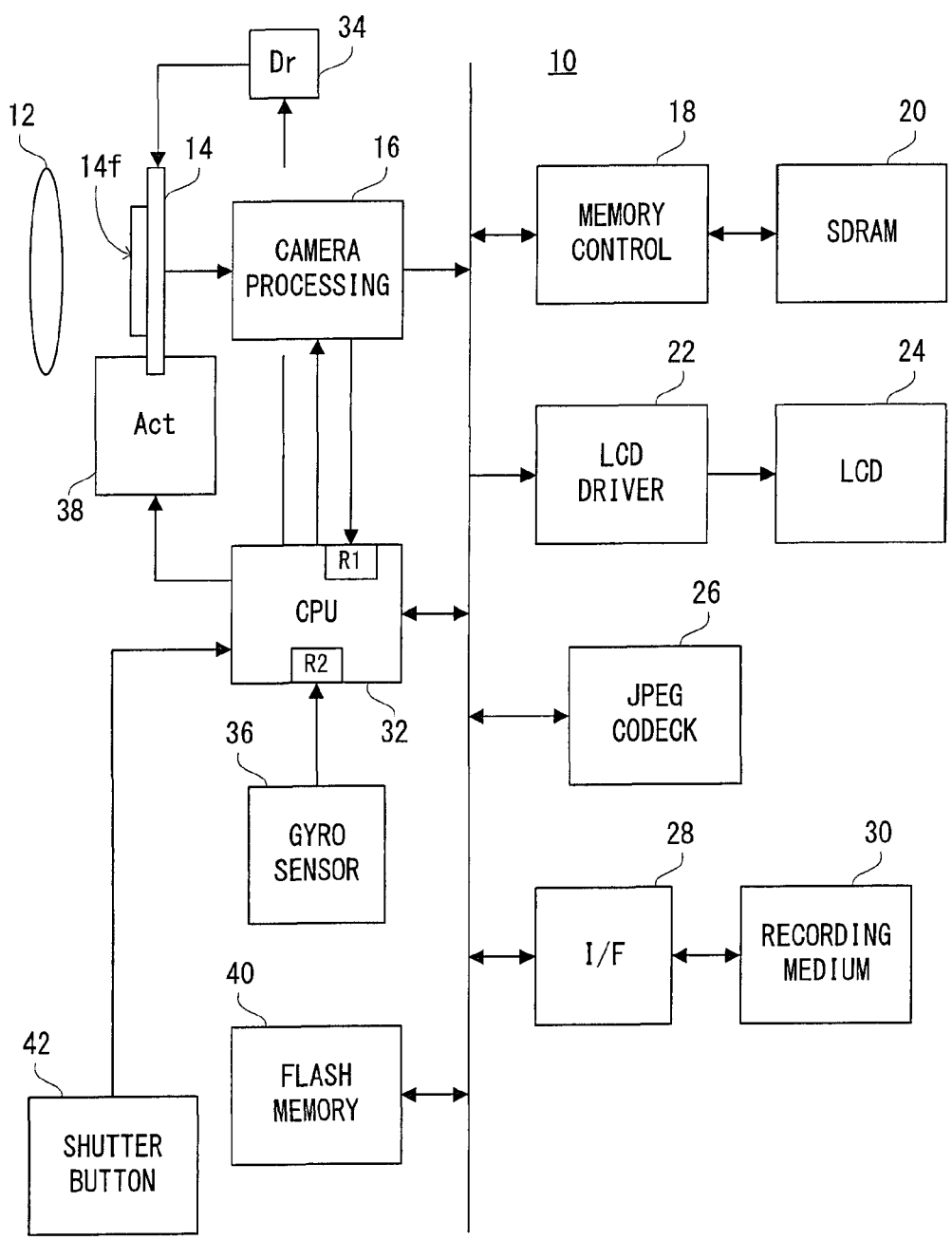
FIG. 1 is a block diagram showing one embodiment of the present invention.

Referring to FIG. 1, a digital camera 10 of this embodiment includes an image sensor 14. An optical image of an object scene is irradiated onto an acceptance surface of the image sensor 14, that is, the imaging surface 14f through an optical lens 12, and on the imaging surface 14f, an electric charge corresponding to the optical image of the object, that is, a raw image signal is generated by a photoelectronic conversion.

When a real-time motion image, that is, a through-image of the object is displayed on an LCD monitor 24, a CPU 32 instructs a driver 34 to repetitively perform a pre-exposure and a thinning-out reading. The driver 34 repetitively executes a pre-exposure of the image sensor 14 and a thinning-out reading of the raw image signal thus generated. A low-resolution raw image signal corresponding to the optical image of the object is output from the image sensor 14.

The output raw image signal is subjected to a series of processing, such as an A/D conversion, and a YUV conversion by a camera processing circuit 16, so that image data being a digital signal according to a YUV format is generated. The generated image data is written to an SDRAM 20 by a memory control circuit 18, and then read by the same memory control circuit 18. An LCD driver 22 drives the LCD monitor 24 according to the image data read by the memory control circuit 18 to thereby display a through-image of the object on the monitor screen.

The Y data out of the image data generated by the camera processing circuit 16 is also applied to the CPU 32 for an exposure control. The CPU 32 generates a luminance evaluated value by adding up the applied Y data. The generated luminance evaluated value is written to a luminance memory R1. Here, the luminance memory R1 (and angular velocity memory R2: to be referred later) is integrated in the CPU 32 in FIG. 1, but may be provided outside the CPU 32.

The CPU 32 adjusts the pre-exposure time set to the driver 34 on the basis of the data of the luminance memory R1. By such an exposure control, brightness of the through-image to be output from the LCD monitor 24 is adjusted.

Furthermore, the digital camera 10 further includes a gyro sensor 36. The gyro sensor 36 repetitively detects an angular velocity of the digital camera 10, and applies angular velocity data indicating the detection result to the CPU 32. The CPU 32 writes the applied angular velocity data to the angular velocity memory R2.

Figure 2:
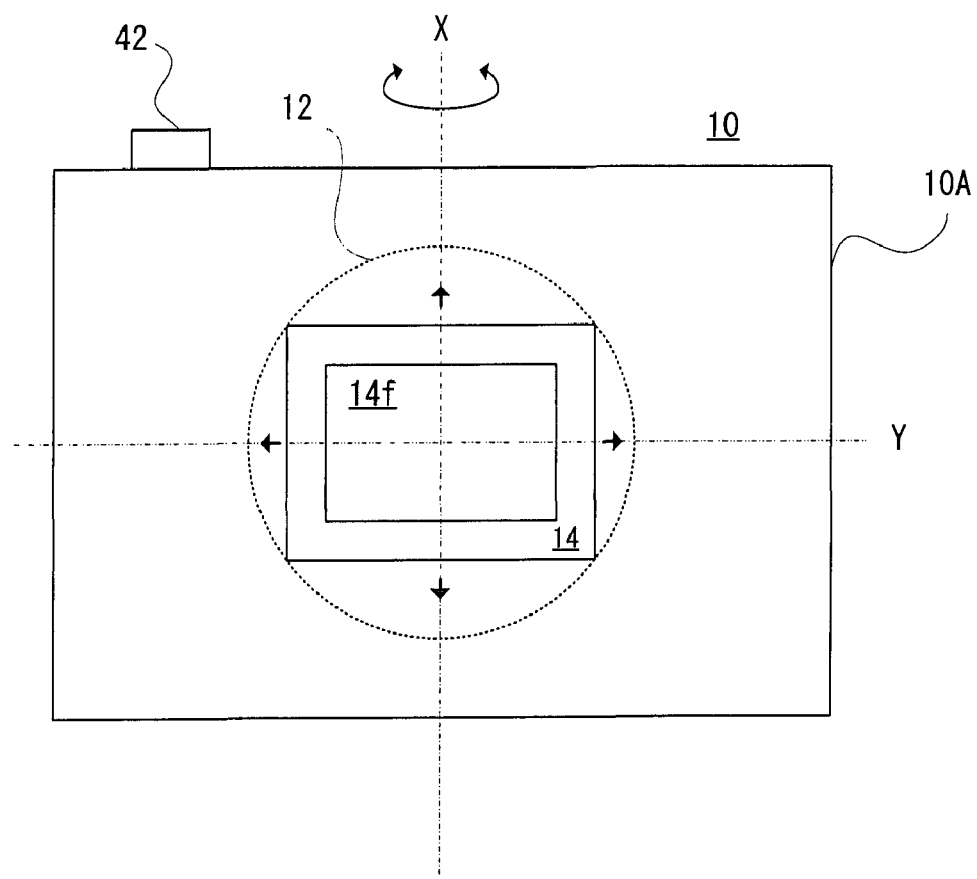
FIG. 2 is an illustrative view showing a rotation of a digital camera for a panoramic shooting, and a movement of the image sensor for correcting an unintentional movement.
Figure 3:
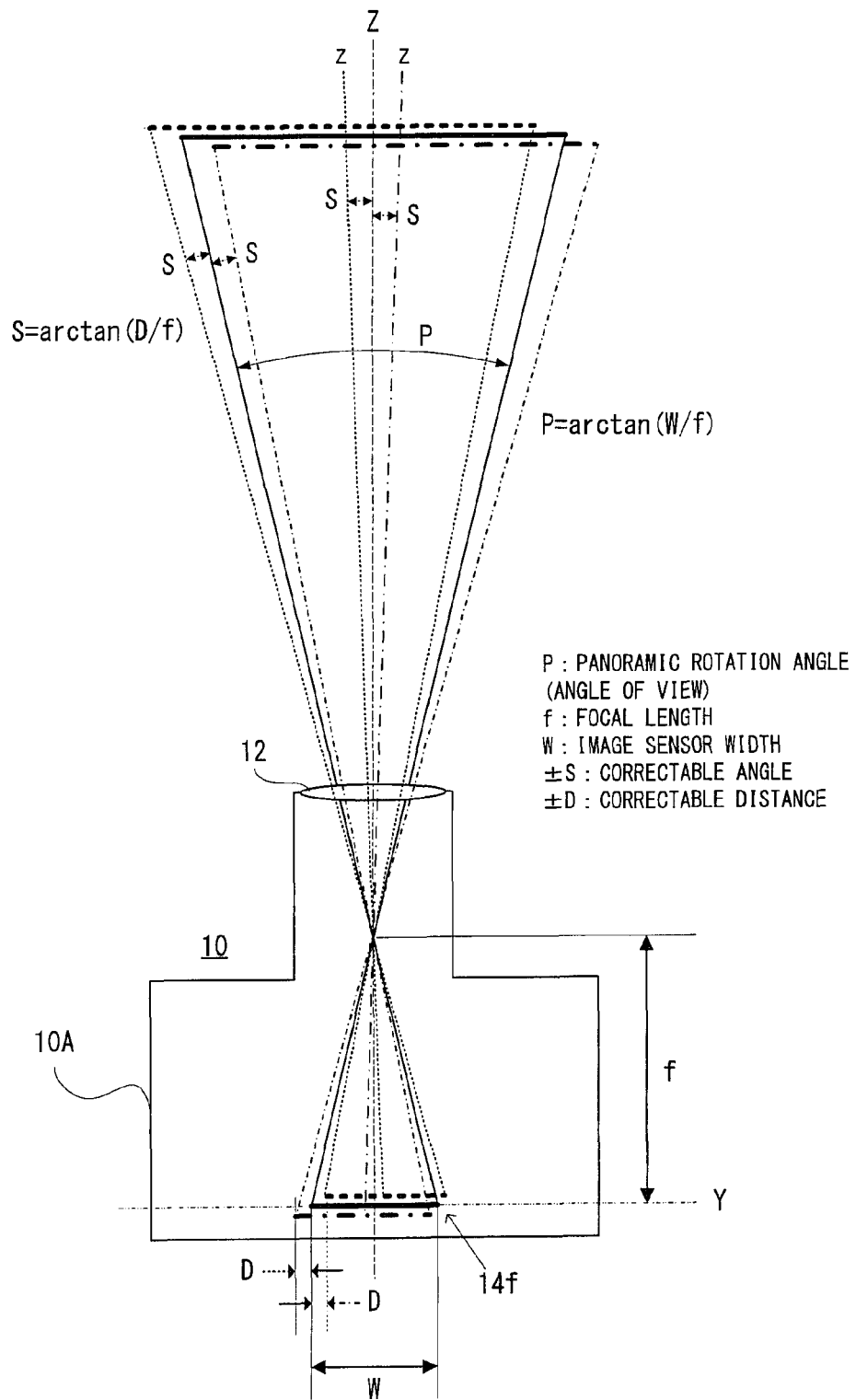
FIG. 3 is an illustrative view for explaining unintentional movement correcting processing applied to FIG. 1 embodiment.

Referring now to FIG. 2, the digital camera 10 has a housing 10A. The image sensor 14 is provided inside the housing 10A, and the optical lens 12 is attached to an opening formed at the front surface of the housing 10A. In this embodiment, with respect to the housing 10A, the vertical direction (a short side direction of the imaging surface 14f) shall be an "X" direction, and the horizontal direction (a long side direction of the imaging surface 14f) shall be a "Y" direction, and the direction vertical to each of the X direction and the Y direction shall be a "Z direction". Using this definition, the Z direction coincides with an optical axis direction of the optical lens 12 as shown in FIG. 3.

Then, the gyro sensor 36 is a two-axis sensor for detecting an angular velocity about an X axis along the X direction, and an angular velocity about a Y axis along the Y direction. Accordingly, the detection result of the gyro sensor 36 includes two components like an angular velocity component about the X axis and an angular velocity component about the Y axis, respectively.

On the one hand, the image sensor 14 is supported so as to be movable in an arbitarary direction within a single planar face in parallel with the imaging surface 14f by the actuator 38. The CPU 32 calculates an unintentional movement correcting amount in the X direction (dX) and an unintentional movement correcting amount in the Y direction (dY) on the basis of the data stored in the angular velocity memory R2. Then, the CPU 32 controls the actuator 38 to move the image sensor 14 in the X direction and the Y direction by dX and dY.

Thus, even if the optical image on the imaging surface 14f is displaced by an influence due to an unintentional movement, the imaging surface 14f consequently follows the displacement of the optical image, so that a blur of the through-image is reduced. Such unintentional movement correcting processing is executed not only in a through image shooting but also in a panoramic shooting.

Figure 4:
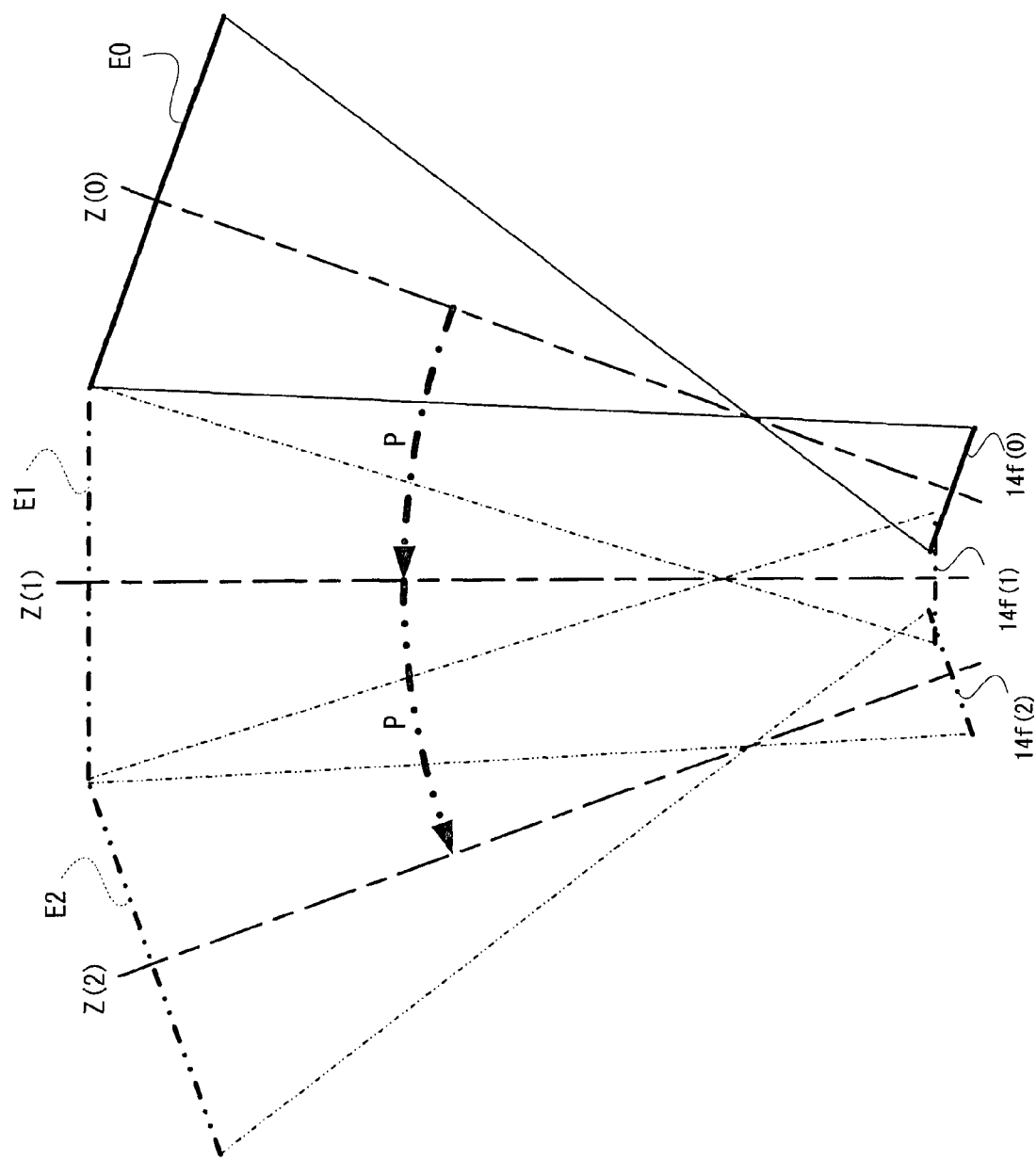
FIG. 4 is an illustrative view for explaining panoramic exposure processing applied to FIG. 1 embodiment.

When a panoramic shooting is performed, the user rotates the digital camera 10 about the X axis as shown in FIG. 2. The digital camera 10 repetitively executes primary exposure processing during the rotation. This allows a plurality of object scenes (E0, E1, E2 . . . ) being continuous in a circumferential direction to be shot in turn as shown in FIG. 4. The series of object scene images thus obtained is less blur caused by movements due to the rotation as a result of the unintentional movement correcting processing as described above. After the rotation, the digital camera 10 combines the plurality of obtained object scene images to record the same as a single panoramic object scene image.

Specifically, the user first half-depresses a shutter button 42 in a state that the optical axis of the optical lens 12, that is, the Z axis is directed to the center of a head object scene E0 out of the series of object scenes E0, E1, E2 . . . . The CPU 32 of the digital camera 10 executes exposure controlling processing for panoramic shooting in response to the half depressing operation. More specifically, an optimal exposure time (T) for panoramic shooting is calculated on the basis of the data in the luminance memory R1, and the resultant is set to the driver 34.

The user then fully-depresses the half-depressed shutter button 42 and starts a rotating operation with the shutter button 42 fully-depressed. The CPU 32 executes first exposure processing in response to the fully-depressing operation.

In the first exposure processing, the CPU 32 instructs the driver 34 to execute a primary exposure and a reading of all the electric charges thus generated. The image sensor 14 is subjected to the primary exposure according to the optimal exposure time T, and all the electric charges thus generated, that is, a high-resolution raw image signal is output from the image sensor 14. The output raw image signal is converted into image data in YUV format by the camera processing circuit 16. The converted image data, that is, image data corresponding to the object scene E0 is written to the SDRAM 20 through the memory control circuit 18.

After completion of writing the image data, the CPU 32 stops the unintentional movement correcting processing, and then advances the image sensor 14 by the angle "s" via the actuator 38. The sensor advancing processing is executed by the following processes.

That is, first, an angular velocity (w) about the X axis is obtained from the angular velocity memory R2. Next, a sensor advancing angle s is evaluated from the following equation (1) on the basis of the angular velocity w, and the exposure time T previously set in the driver 34.

$$s = w*T/2 \tag{1}$$

Figure 5:
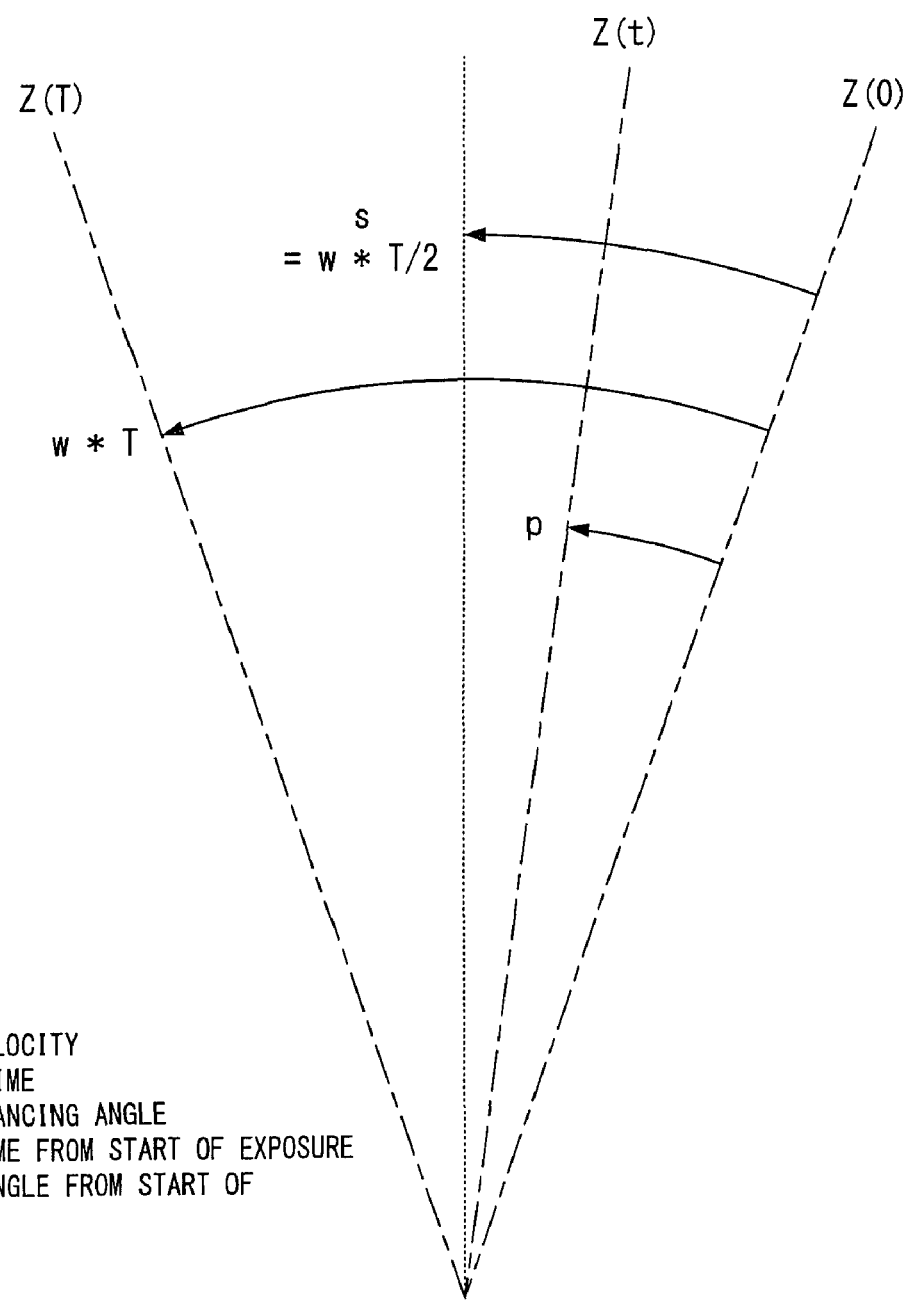
FIG. 5 is an illustrative view showing sensor advancing processing applied to FIG. 1 embodiment.

The sensor advancing angle s thus calculated corresponds to a value half of the rotation angle during the exposure time T, that is, w*T (see FIG. 5). Next, a sensor advancing distance m corresponding to the sensor advancing angle s is evaluated from the following Equation (2).

$$m = f*\tan(s) \tag{2}$$

Figure 14:
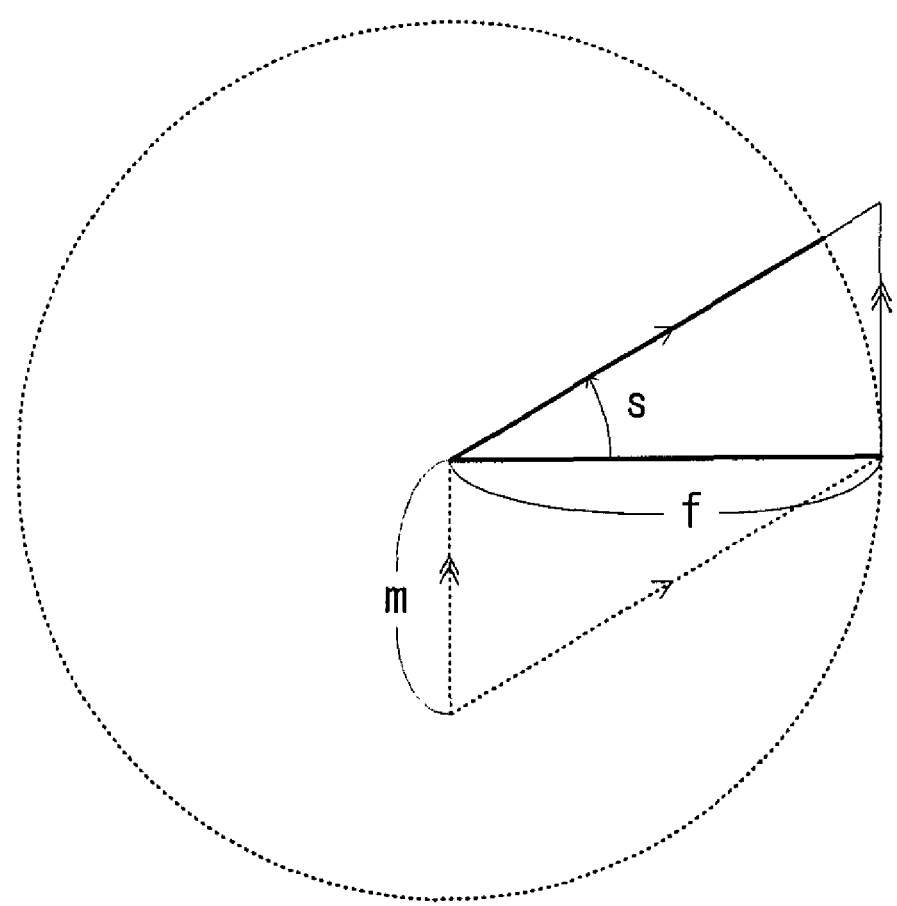
FIG. 14 is an illustrative view showing a sensor advancing distance.

Here, f is a focal length of the optical lens 12 (see FIG. 3 and FIG. 14).

Then, the actuator 38 is controlled to move the image sensor 14 in the Y direction by the distance "m". Thus, the optical axis z of the image sensor 14 consequently advances by the angle "s" from the Z axis being the optical axis of the optical lens 12 (see FIG. 6(A)). Then, during a period until a second primary exposure is started, the optical axis z and the Z axis are rotated at a common angular velocity (w) with the angle "s" kept (see FIG. 6(B)). Here, since the angular velocity w is a rotation by a hand of the person, it changes from moment to moment.

Furthermore, the CPU 32 repetitively calculates a rotation angle (p) of the Z axis. Here, the rotation angle p is a rotation angle obtained by regarding the position of the Z axis at a start of the exposure as a starting point as shown in FIG. 5. The CPU 32 resets a variable t indicating a time period and a variable p indicating a rotation angle (t=0, p=0) at a start of the primary exposure, and updates the variable p according to the following equation (3) every time that the angular velocity w is obtained.

$$p=p+w*\Delta t \quad (3)$$

Here, Δt is a cycle (1/100 second, for example) to obtain an angular velocity. Thus, by adding up w*Δt, the rotation angle p from the start of the primary exposure can be obtained.

The CPU 32 restarts an unintentional movement correcting task at timing when the rotation angle p satisfies the following equation (4), and executes the second primary exposure processing.

$$p \geq P-s \quad (4)$$

Here, P is an angle of view in the Y direction of the object scene (E0, E1 . . . ) which can be photographed by one exposure processing, and is called a "panoramic rotation angle" (see FIG. 3). The panoramic rotation angle P is calculated on the basis of the focal length (f) of the optical lens 12 and the length (W) of the imaging surface 14*f* in the Y direction from the following equation (5).

$$P=\arctan(W/f) \quad (5)$$

Figure 6:
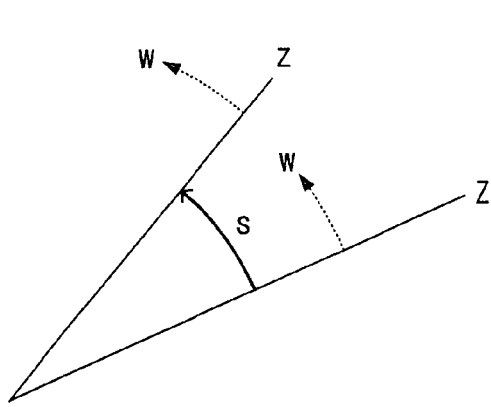
FIG. 6(A)-FIG. 6(D) is an illustrative view showing in time sequence a change in a positional relationship between an optical axis (Z axis) of an optical lens and an optical axis z of an image sensor.
Figure 6:
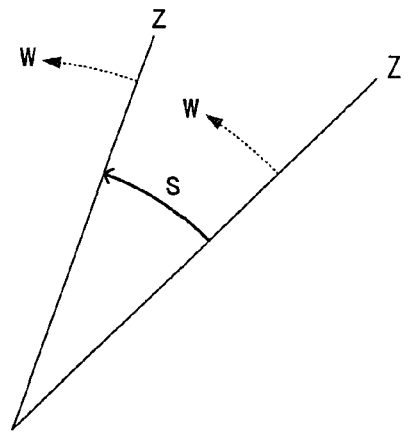
Figure 6:
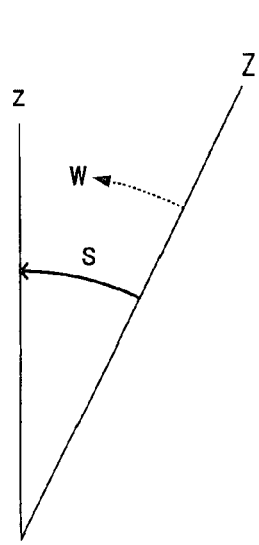
Figure 6:
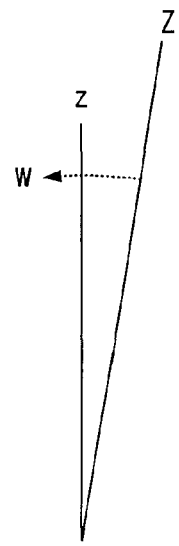
Figure 7:
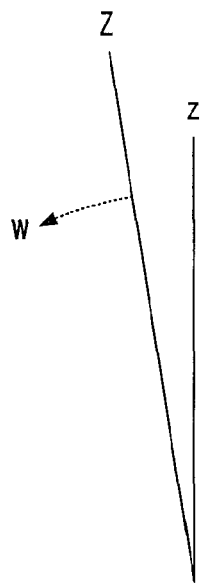
FIG. 7(A)-FIG. 7(C) is an illustrative view showing a change continued from FIG. 6(D) in time sequence.
Figure 7:
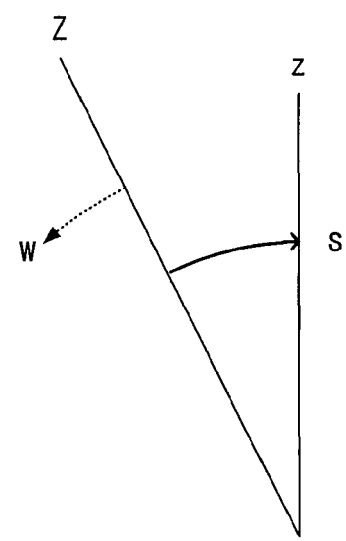
Figure 7:
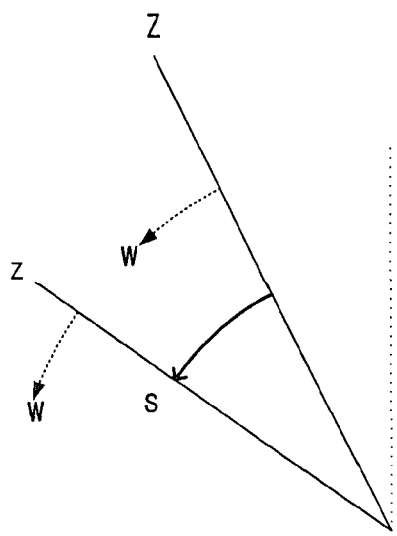

Due to the unintentional movement correcting task being restarted, the optical axis z which has rotated at a common angular velocity w in front of the Z axis suspends the advancing processing as a second exposure is started, and as a result, the rotational velocity becomes "0" (that is, the optical axis z of the image sensor 14 stands still with respect to the object scene: see FIG. 6(C)). At this time, each of the variable t and the variable p is reset. The second exposure processing is executed as in the aforementioned first exposure processing in parallel with the unintentional movement correcting task. For the duration of execution of the exposure processing, the rotational velocity of the optical axis z holds zero by the unintentional movement correcting processing during a time until the second exposure processing has been finished (that is, the optical axis z remains in a still state with respect to the object scene: see FIG. 6(D), FIG. 7(A) and FIG. 7(B)).

That is, according to the principle similar to a so-called "follow shot" to be performed when a moving object such as a running automobile is photographed, since the image sensor 14 stands still with respect to the object scene E1 during the exposure processing, it is possible to obtain an object scene image without a movement due to the rotation while the exposure is performed without suspending the rotation.

After completion of the second exposure processing, the unintentional movement correcting task is stopped again to thereby execute sensor advancing processing as described before. Thus, the optical axis z advance by the angle "s" with respect to the Z axis, and rotates at a common angular velocity w while keeping the interval of the angle "s" with the Z axis during the time until the third primary exposure processing is started (see FIG. 7(C)).

The CPU 32 further writes image data corresponding to the obtained object scene E1 to the SDRAM 20 through the memory control circuit 18.

From now on, until the end condition is satisfied, specifically, until the shutter operation is released, or until the number of successive executions of the primary exposure reaches the fixed value ("5", for example), the processing similar to the above description is repeated.

Accordingly, in the first exposure processing to be executed in a still state, the object scene image with less blur due to the unintentional movement can be obtained, and in the second exposure processing onward to be executed in a rotating state, an object scene image with less blur due to each of the unintentional movement and the movement due to the rotation can be obtained.

Furthermore, in the second exposure processing onward, the optical axis z of the image sensor 14 advances the Z axis before the start of the exposure, and therefore, the allowance of the angular velocity w (and/or exposure time T) is increased. Specifically, the advancing angle is set to "s" to double the allowance. In addition, the advancing angle shall be "s", and exposure processing is started when the rotation angle of p reaches "P−s", and whereby, it is possible to minimize distortion of the object scene image by the unintentional movement correcting processing.

However, if the rotational movement by the user is so rapid, it is impossible to cancel out the influence of the rotation in the aforementioned unintentional movement correcting processing. Now, the CPU 32 stops the sensor advancing processing when the sensor advancing angle s calculated in the aforementioned equation (1) satisfies the following equation (6).

$$s \leq S \quad (6)$$

Here, S is a correctable angle about the X axis as shown in FIG. 3, and can specifically be obtained in the following equation (7) by regarding a maximum travel distance (correctable distance) in the Y direction of the image sensor 14 as "D".

$$S=\arctan(D/f) \quad (7)$$

As the sensor advancing processing is stopped, the CPU 32 displays an alarm/guide screen (not shown) on the through-image by controlling the LCD driver 22. The alarm/guide screen includes an alarm indicating that the rotating movement is so rapid and a guide for stopping the rotation of the digital camera 10 at the position of "p=P" (graphic indicating the center of the object scene to be photographed, etc.)

When the shutter operation is released, or when the number of successive executions of the primary exposure reaches the fixed value, the CPU 32 combines the plurality of object scene images stored in the SDRAM 20 with each other by controlling the memory control circuit 18. Next, the JPEG codec 26 is instructed to perform compression processing on the image data corresponding to the obtained single panoramic object scene image. The JPEG codec 26 reads the corresponding image data from the SDRAM 20 through the memory control circuit 18, and performs a JPEG compression on the read image data. The compressed image data thus generated is written to the SDRAM 20 through the memory control circuit 18. After completion of the JPEG compression, the CPU 32 reads the compressed image data from the SDRAM 20 through the memory control circuit 18, and records an image file including the read compressed image data in the recording medium 30 through the I/F 28.

The processing by the CPU 32 as described above is executed according to flowcharts shown in FIG. 8-FIG. 13. More specifically, the CPU 32 executes a main task shown in FIG. 8-FIG. 10, a rotation angle (p)/advancing angle (s) calculating task shown in FIG. 11, an unintentional movement correcting task shown in FIG. 12, and a display controlling task shown in FIG. 13. When a panoramic shooting mode is turned on, the main task is first activated, and followed by the rotation angle (p)/advancing angle (s) calculating task, the unintentional movement correcting task and the display controlling task by the main task.

Additionally, the CPU 32 can execute in parallel a plurality of tasks including these tasks under the control of the multitasking OS such as a μITRON, etc. The programs corresponding to these flowcharts are stored in the flash memory 40.

Figure 8:
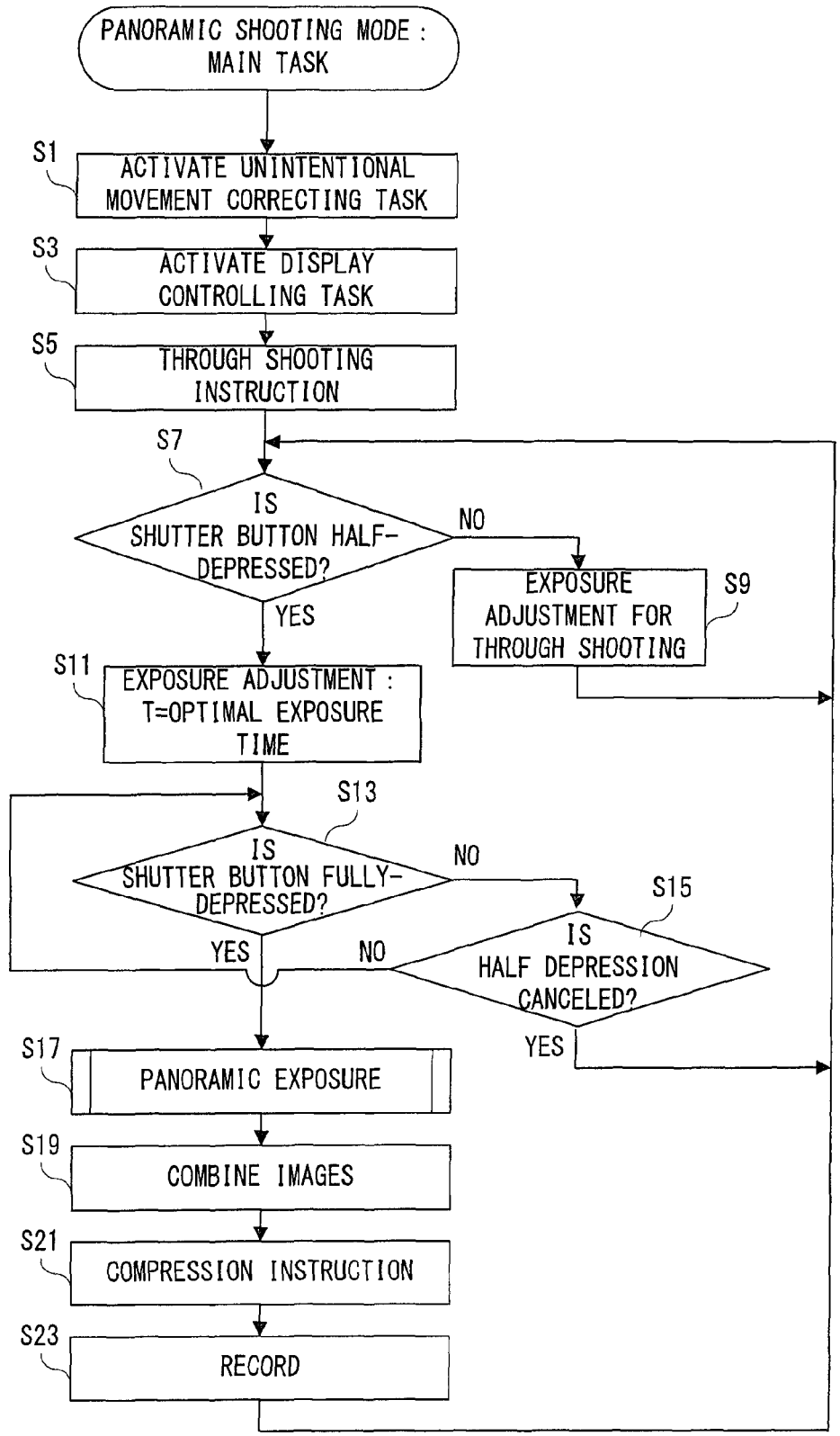
FIG. 8 is a flowchart showing a part of an operation of the CPU applied to FIG. 1 embodiment.

Referring now to FIG. 8, when the main task is activated, the CPU 32 first activates the unintentional movement correcting task and the display controlling task in step S1 and S3, respectively, and a through shooting instruction is issued in a step S5. In response to the instruction, the through shooting processing described above is started to display a through-image of an object on the monitor screen. Furthermore, writing processing of a luminance evaluated value to the luminance memory R1 is also started.

In a succeeding step S7, it is determined whether or not the shutter button 42 is half-depressed, and if the determination result is negative ("NO"), an exposure adjustment for through shooting is performed in a step S9. More specifically, the pre-exposure time set to the driver 34 is adjusted on the basis of the luminance evaluated value stored in the luminance memory R1. Then, the process returns to the step S7.

If the determination result in the step S7 is affirmative (YES), the process proceeds to a step S11 to perform an exposure adjustment for panoramic shooting and sets the obtained optimal exposure time (T) to the driver 34. Then, the process enters a loop among steps S13 and S15 to wait until the shutter button 42 in the half-depressed state shifts to the fully-depressed state, or until the half depressing operation is canceled.

If the half depressing operation is canceled, "YES" is determined in the step S15, and the process returns to the step S7. If the shutter button 42 shifts from the half-depressed state to the fully-depressed state, "YES" is determined in the step S13, and the process shifts to a step S17 to execute panoramic exposure processing (described later). At a time of completing the panoramic exposure processing, a plurality of object scene images each corresponding to a series of object scenes E0, E1, . . . (see FIG. 4) are stored in the SDRAM 20. In a succeeding step S19, the plurality of object scene images stored in the SDRAM 20 are combined with each other, and the obtained single panoramic object scene image is written to the SDRAM 20 again. Then, in a step S21, the JPEG codec 26 is instructed to compress the panoramic object scene image stored in the SDRAM 20.

When the JPEG codec 26 executes the compression processing to write the compressed image data to the SDRAM 20, the process shifts to a step S23. In the step S23, the compressed image data is read from the SDRAM 20 so as to be recorded in the recording medium 30 in a JPEG file format.

Figure 9:
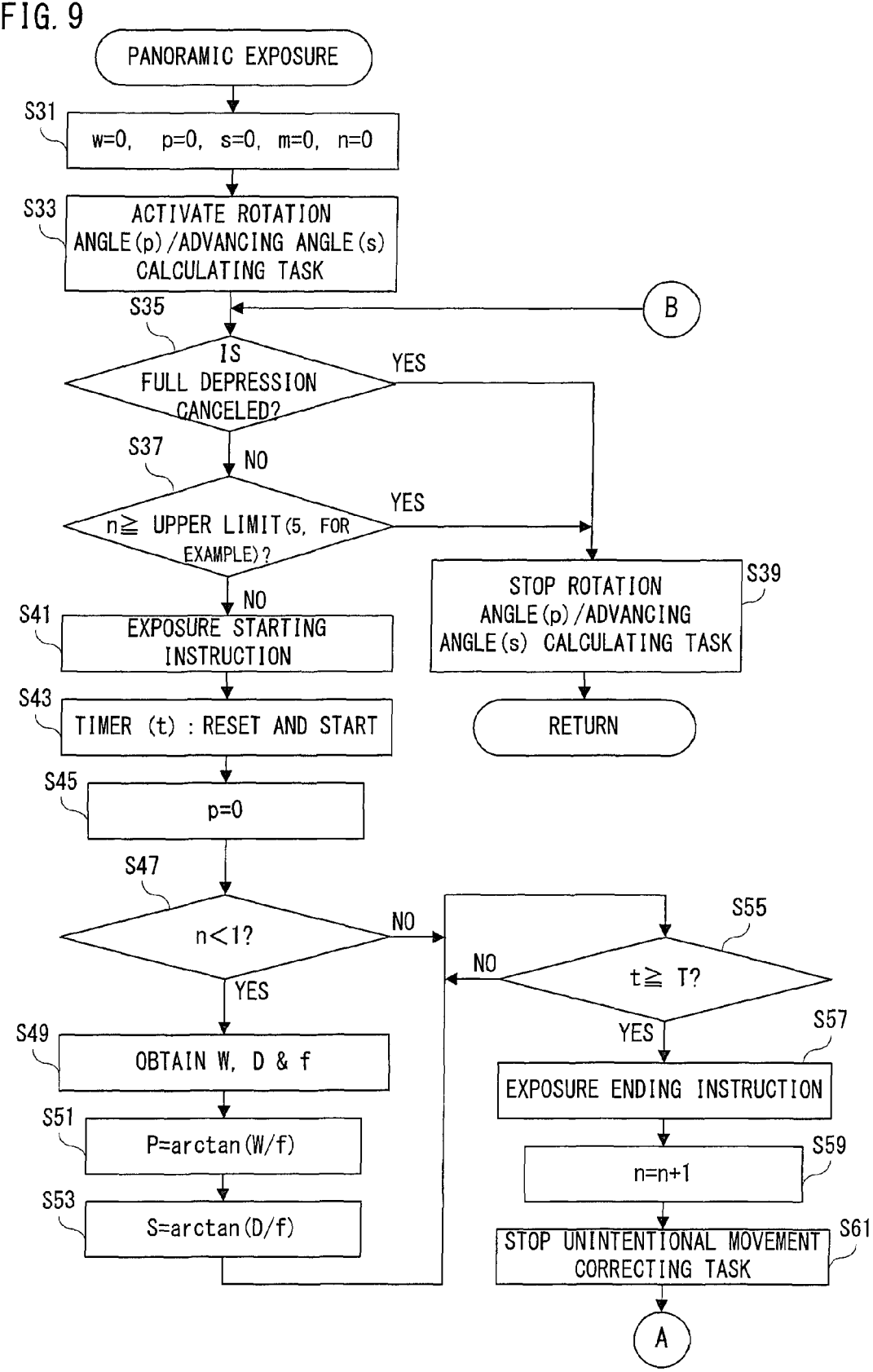
FIG. 9 is a flowchart showing another part of the operation of the CPU applied to FIG. 1 embodiment.
Figure 10:
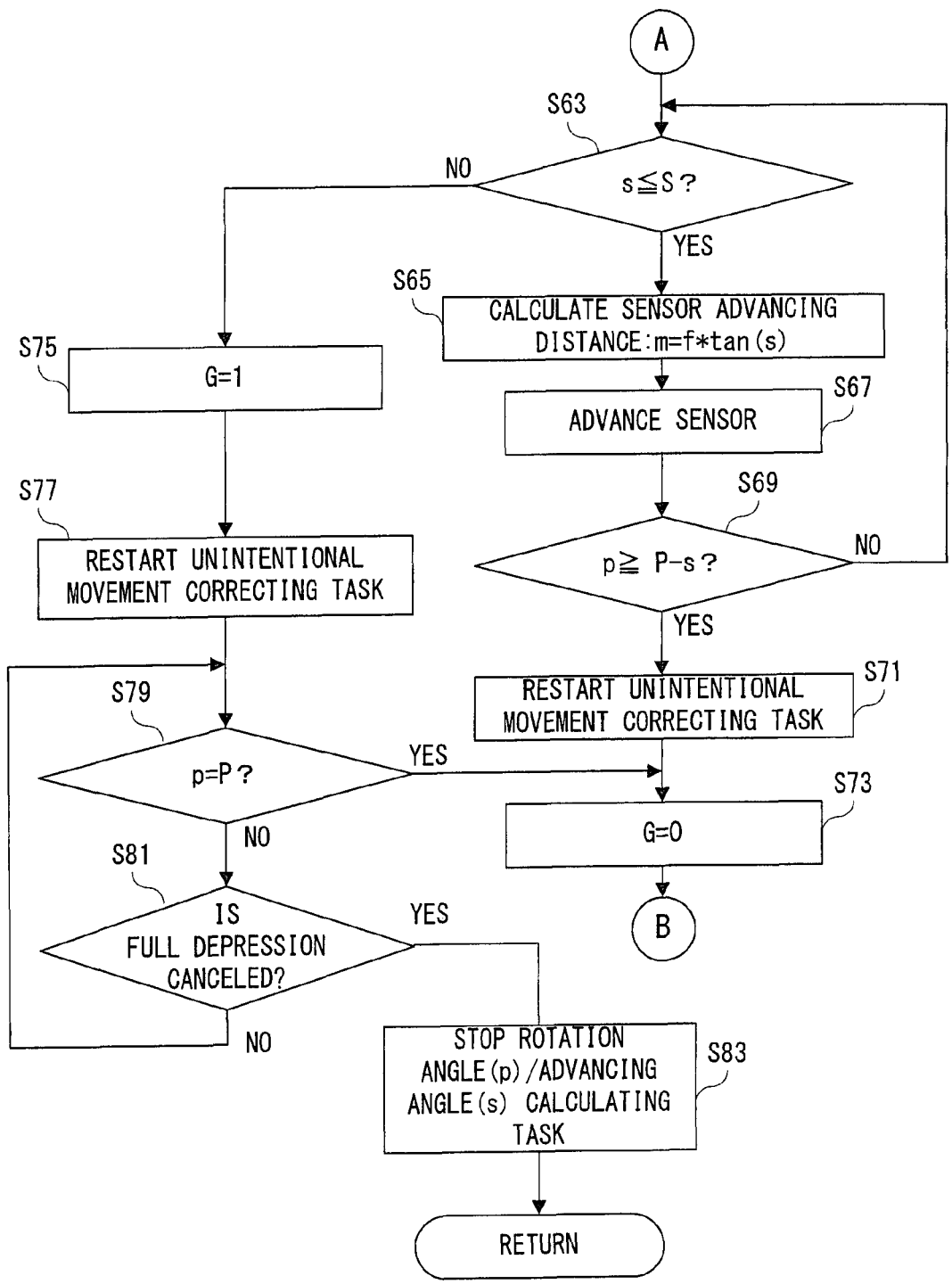
FIG. 10 is a flowchart showing a still another part of the operation of the CPU applied to FIG. 1 embodiment.

The panoramic exposure processing in the aforementioned step S17 is according to the subroutine shown in FIG. 9 and FIG. 10. Referring now to FIG. 9, in a first step S31, "0" are set as initial values to a variable w indicating the angular velocity, a variable p indicating a rotation angle, a variable s indicating a sensor advancing angle, a variable m indicating a sensor advancing distance, and a variable n indicating the number of successive executions of this primary exposure processing.

In a following step S33, the rotation angle (p)/advancing angle (s) calculating task is activated. The rotation angle (p)/advancing angle (s) calculating task repetitively calculates the rotation angle and the advancing angle at a cycle of $\frac{1}{100}$ seconds and sets the result in the variable p and the variable s (the detail is described later). Then, the process shifts to steps S35 and S37 to determine whether or not the end condition is satisfied.

More specifically, it is determined whether or not the fully-depressing operation is canceled in the step S35, and it is determined whether or not the variable n reaches an upper limit, that is, "5", for example, in the step S37. If any one of the determination result in the step S35 and the determination result in the S37 is "YES", the process proceeds to a step S39 to stop the rotation angle (p)/advancing angle (s) calculating task, and the process is restored to the routine at the hierarchical upper level.

If the determination result in each of the steps S35 and S37 is "NO", the process shifts to a step S41 to issue an exposure starting instruction. In response to the instruction, the primary exposure processing as described above is executed, so that an object scene image corresponding to the optical image irradiated onto the imaging surface 14*f* is recorded in the SDRAM 20.

Furthermore, as the primary exposure processing is started, a timer is reset and started in a step S43. Thus, a variable t (see FIG. 5) indicating an elapsed time from the start of the exposure is initialized. Then, in a step S45, the variable p is reset, and the process proceeds to a step S47.

In the step S47, it is determined whether or not the variable n is smaller than "1", and if the determination result is "YES", various parameters are obtained/calculated in steps S49-S53, and the process shifts to a step S55. If the determination result in the step S47 is "NO", the process directly shifts to the step S55. Accordingly, the processing in the steps S49-S53 is executed only at the first primary exposure processing. In the step S49, an image sensor width W, a correctable distance D, and a focal length f are obtained. It should be noted that the values of these parameters are stored in the flash memory 40. In the step S51, a panoramic rotation angle P is calculated from the aforementioned equation (5), and in the step S53, a correctable angle S is calculated from the aforementioned equation (7).

In the step S55, it is determined whether or not the value of the timer, that is, the variable t reaches the exposure time T, and if "NO" is determined, a stand-by state continues. If the determination result in the step S55 is "YES", the process shifts to a step S57 to issue an exposure ending instruction. Then, the variable n is incremented in a step S59, and moreover, the unintentional movement correcting task is stopped in a step S61, and then, the process proceeds to a step S63.

With reference to FIG. 10, it is determined whether or not the variable s satisfies the aforementioned equation (6) in the step S63, and if the determination result is "YES", the process proceeds to a step S73 through steps S65-S71. In the step S65, a sensor advancing distance (m) is calculated from the aforementioned equation (2), and in the step S67, the actuator 38 is controlled to execute sensor advancing processing.

In the step S69, it is determined whether or not the variable p satisfies the aforementioned equation (4), and if the determination result is "NO", the process returns to the step S63. If the determination result in the step S69 is "YES", the unintentional movement correcting task is restarted in the step S71, the flag G is reset in the step S73, and then, the process returns to the step S35.

If "NO" is determined in the step S63, "1" is set to the flag G in a step S75, the unintentional movement correcting task is restarted in a step S77, and then, the process enters a loop among steps S79 and S81. It is determined whether or not the variable p coincides with the panoramic rotation angle P in the step S79, and it is determined whether or not the fully-depressing operation is canceled in the step S81.

When the user rotates the digital camera 10 to an appropriate position with reference to the monitor screen, the determination result in the step S79 is "YES", the process goes out of the loop to reset the flag G in the step S73, and then, the process returns to the step S35. If the user stops fully-depressing the shutter button 42, the determination result in the step S81 is "YES", the process goes out of the loop, and the process shifts to a step S83.

In the step S83, the rotation angle (p)/advancing angle (s) calculating task is stopped. Then, the process is restored to the routine at the hierarchical upper level.

Figure 11:
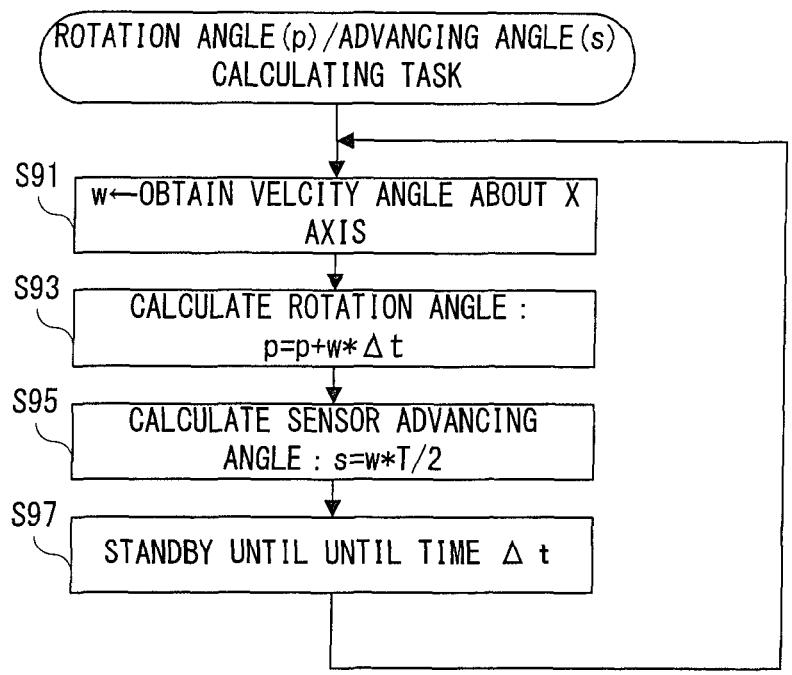
FIG. 11 is a flowchart showing a further part of the operation of the CPU applied to FIG. 1 embodiment.

Next, referring to FIG. 11, in the rotation angle (p)/advancing angle (s) calculating task, the CPU 32 first obtains an angular velocity about the X axis from the angular velocity memory R2 in a step S91, and sets the same in the variable w. Next, a rotation angle (p) about the X axis is calculated from the aforementioned equation (3) in a step S93, and a sensor advancing angle (s) is calculated by the aforementioned equation (1) in a step S95. Then, in a step S97, a stand-by state is held until the angular velocity obtaining cycle becomes Δt, and then, the process returns to the step S91.

Figure 12:
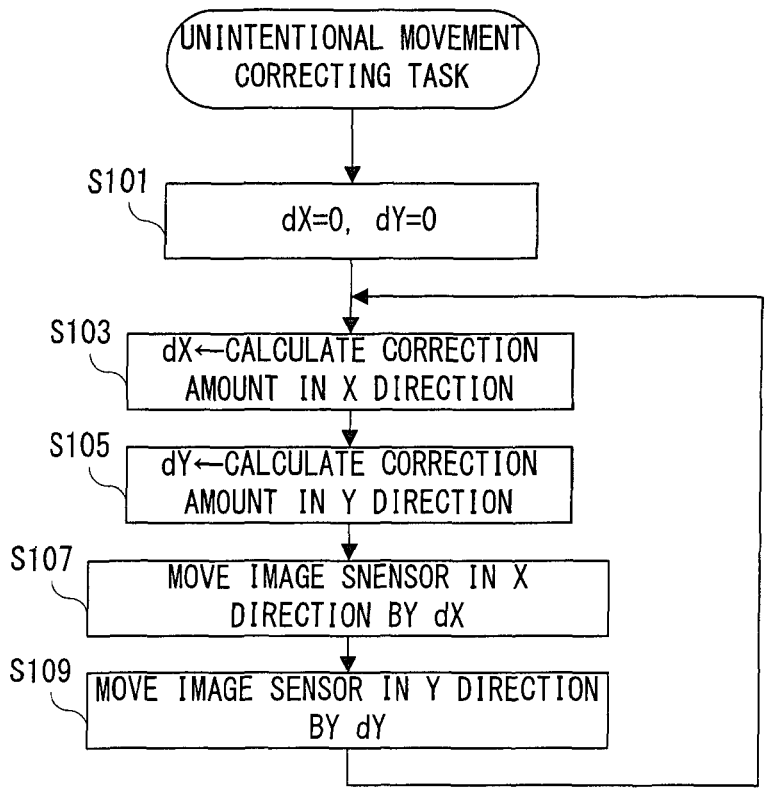
FIG. 12 is a flowchart showing a still further part of the operation of the CPU applied to FIG. 1 embodiment.

Referring next to FIG. 12, in the unintentional movement correcting task, the CPU 32 sets "0" to a variables dX and a variable dY as initial values in a first step S101.

In succeeding steps S103 and S105, a correction amount in the X direction and a correction amount in the Y direction are calculated on the basis of the data in the angular velocity memory R2, and the results are set to the variable dX and the variable dY.

Then, in steps S107 and S109, the actuator 38 is controlled to move the image sensor 14 by the dX in the X direction and by the dY in the Y direction. After the movement, the process returns to the step S103.

Figure 13:
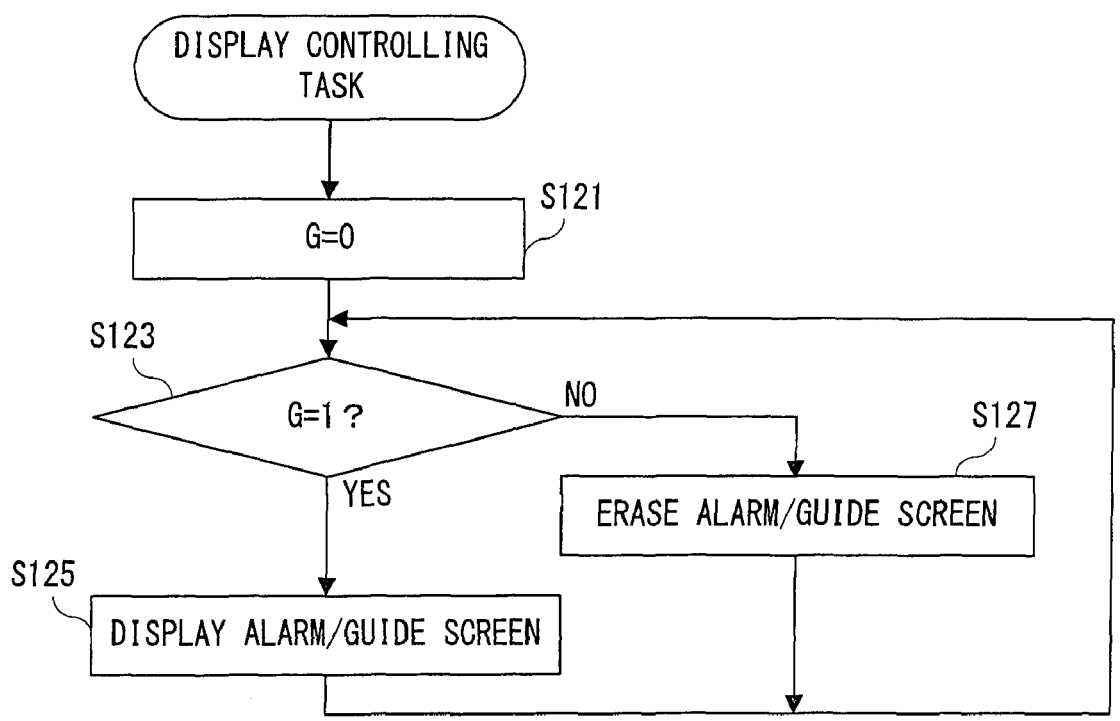
FIG. 13 is a flowchart showing another part of the operation of the CPU applied to FIG. 1 embodiment.

With reference next to FIG. 13, in the display controlling task, the CPU 32 sets "0" to the flag G as an initial value in a first step S121. In a following step S123, it is determined whether or not the flag G is "1". If the determination result is "YES", the process shifts to a step S125 to display an alarm/guide screen on the through-image via the LCD driver 22. Then, the process returns to the step S123.

If the determination result in the step S123 is "NO", the process shifts to a step S127 to erase the alarm/guide screen, and then, the process returns to the step S123.

As understood from the above description, the digital camera 10 of this embodiment includes the optical lens 12 and the image sensor 14. The image sensor 14 has an imaging surface 14f onto which the optical image of the object scene is irradiated through the optical lens 12.

When the digital camera 10 is rotated, the CPU 32 repetitively measures the rotation angle (p) on the basis of the output from the gyro sensor 36 (S91, S93). Then, every time that the result of the measurement and the angle of view (P) of the optical image irradiated on to the imaging surface 14f satisfy an angular condition, exposure processing is performed on the image sensor 14 via the driver 34 (S41, S57). During the exposure processing, the CPU 32 controls the actuator 38 so as to cause the image sensor 14 to follow the movement of the optical image due to the rotation (S1, S71, S77).

The object scene image generated by the exposure processing is captured in the SDRAM 20 by the memory control circuit 18. After completion of the series of exposure processing, the CPU 32 combines the plurality of object scene images stored in the SDRAM 20 with each other to produce a single panoramic object scene image (S19).

This eliminates the need for stopping the rotation every exposure, and allows a high accurate panoramic shooting to be efficiently performed.

Additionally, in this embodiment, as a system of correcting the unintentional movement, a sensor moving system of moving the image sensor 14 is adopted. Alternatively, an optical system of moving the optical lens 12 may be adopted. An electronic system for moving an effective pixel area of the image sensor 14 can also be employed.

Furthermore, in this embodiment, a panoramic shooting is performed while the digital camera 10 is rotated about the X axis, but the rotation shaft may be the Y axis.

In addition, in this embodiment, the gyro sensor 36 is utilized, but an angular velocity sensor other than this may be utilized. Alternatively, in place of the angular velocity sensor, a rotation angle sensor may be used. In this case, the angular velocity can be calculated as an amount of change per unit time. Additionally, a linear velocity sensor may be employed for a tight close-up (macro) shooting.

Furthermore, in this embodiment, the CPU 32 combines the plurality of object scene images stored in the SDRAM 20 with each other (S19), but the image combining processing may be executed by external devices like a PC.

Moreover, in this embodiment, the focal length f of the optical lens 12 shall be constant but may be variable. In this case, for zooming, a motor (not shown) to change the focal length of the optical lens 12 is required. The CPU 32 recognizes a variable f (that is, the current focal length), and can perform calculating processing by the aforementioned equation (5) and calculating processing by the aforementioned equation (7), on the basis of this.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera which performs an exposure while rotating, comprising:
    a housing provided with an optical lens;
    an imager provided to the housing and having an imaging surface onto which an optical image of an object scene is irradiated through the optical lens;
    a measurer that repetitively measures a rotation angle of the housing;
    an exposer that performs an exposure processing on the imager every time that the measurement result by the measurer and an angle of view of the optical image irradiated onto the imaging surface satisfy an angular condition;
    a suppresser that suppresses a change in a positional relationship between the imaging surface and the optical image irradiated onto the imaging surface by moving at least one of the optical lens and the imager on the basis of the measurement result;
    wherein the change is due to rotation of the housing during a period of the exposure processing being performed,
    a first invalidator that invalidates the suppresser during a period from an end of one exposure processing to a start of the next exposure processing, by the exposer;
    a mover that moves said at least one of the optical lens and the imager in a direction that a maximum value of displacement which is suppressible by the suppresser in the next exposure period is increased, during a period when the suppresser is invalidated by the first invalidator; and
    a capturer that captures the object scene image generated on the imaging surface according to the exposure processing by the exposer in a memory.

2. A digital camera according to claim 1,
    wherein the measurer includes
        a detector that detects an angular velocity of the housing; and a first calculator that calculates a rotation angle from a starting point of each exposure processing by the exposer on the basis of the detection result by the detector.

3. A digital camera according to claim 1, further comprising
a displacer that displaces a position of said at least one of the optical lens and the imager, wherein
the suppresser controls the displacer on the basis of the measurement result by the measurer to cause the imager to follow a movement of the optical image.

4. A digital camera according to claim 3, wherein:
the mover includes an advancer that advances said at least one of the optical lens and the imager with respect to the housing by controlling the displacer during a period when the suppresser is invalidated by the first invalidator.

5. A digital camera according to claim 4, further comprising a second calculator for calculating a half-value of the rotation angle of the housing corresponding to the exposure time of one exposure processing by the exposer on the basis of the detection result by the detector, wherein
the advancer advances a position of said at least one of the optical lens and the imager with respect to the housing by a distance corresponding to the calculation result by the second calculator.

6. A digital camera according to claim 5, further comprising:
a second invalidator that invalidates the advancer when the calculation result by the second calculator is above a maximum rotation angle corresponding to a maximum displacement by the displacer; and
an informer that executes informing processing to a user in response to the invalidating processing by the second invalidator.

7. A digital camera according to claim 6, wherein
the angular condition is a condition that the calculation result by the first calculator reaches a value obtained by subtracting the calculation result by the second calculator from the angle of view during a period when the advancer is not invalidated by the second invalidator, and
the angular condition is a condition that the calculation result by the first calculator coincides with the angle of view during a period when the advancer is invalidated by the second invalidator.

8. A digital camera according to claim 1, further comprising a producer that combines a plurality of object scene images stored in the memory with each other to produce a single panoramic object scene image.

* * * * *